United States Patent [19]
Martin et al.

[11] Patent Number: 5,847,264
[45] Date of Patent: Dec. 8, 1998

[54] LEAK TESTER WITH FLEXIBLE EQUATION CAPABILITIES

[75] Inventors: Carl R. Martin, Houston; Ronald D. Demott, Sugarland, both of Tex.

[73] Assignee: Roper Holdings, Inc., Wilmington, Del.

[21] Appl. No.: 829,583

[22] Filed: Mar. 31, 1997

[51] Int. Cl.⁶ .................................................. G01M 3/04
[52] U.S. Cl. .................................................. 73/40; 702/51
[58] Field of Search ................ 73/40, 40.5, 49.1, 73/49.2; 702/51, 140

[56] References Cited

U.S. PATENT DOCUMENTS

| | | | |
|---|---|---|---|
| Re. 33,075 | 10/1989 | Holm et al. | 73/40 |
| 3,786,675 | 1/1974 | Delatorre et al. | 73/27 |
| 3,800,586 | 4/1974 | Delatorre et al. | 73/49.2 |
| 4,272,985 | 6/1981 | Rapson, Jr. et al. | 73/49.2 |
| 4,523,452 | 6/1985 | Brayman | 73/40 |
| 4,532,795 | 8/1985 | Brayman et al. | 73/40 |
| 4,686,638 | 8/1987 | Furuse | 73/49.2 X |
| 4,715,214 | 12/1987 | Tveter et al. | 73/40 |
| 4,796,466 | 1/1989 | Farmer | 73/49.1 X |
| 4,811,252 | 3/1989 | Furuse | 73/40 X |
| 4,896,530 | 1/1990 | Lehmann | 73/49.2 |
| 4,947,352 | 8/1990 | Jenkins | 73/49.2 X |
| 4,953,396 | 9/1990 | Langsdorf et al. | 73/49.3 |
| 4,977,528 | 12/1990 | Norris | 364/571.04 |
| 5,065,350 | 11/1991 | Fedder | 364/571.03 |
| 5,526,679 | 6/1996 | Filippi | 702/51 |

FOREIGN PATENT DOCUMENTS 2202638  9/1988  United Kingdom ............... 73/49.2

*Primary Examiner*—Richard Chilcot
*Assistant Examiner*—Paul D. Amrozowicz
*Attorney, Agent, or Firm*—Pravel, Hewitt & Kimball

[57] ABSTRACT

A programmable leak tester is implemented to include the ability for performing a math step in conjunction with the program steps. The math step can use as inputs the result of a previous step, a register value, or a previous compensation or calibration value. As outputs, the math step can provide a compensation or calibration value for use in the execution of another program, can provide a register output, or can be provided as the step result for the current step. By using multiple math steps, the programmable tester provides flexible and adaptable leak testing in a variety of applications.

18 Claims, 21 Drawing Sheets

FIG. 8C

Run  Select  Options  Install  Program  System

| STEP | NAME | PLT | TIME X | UNITS | LOLIMIT | HILIMIT | ACC | REJ | CMD | M | S | LOG |
|---|---|---|---|---|---|---|---|---|---|---|---|---|
| 1 | AUTOZERO | ATZ | 0.1\|1 | PSIG | -1.00 | 22.00 | *** | *** | I/O | E | ** | OFF |
|  |  |  |  | PSIG | 18.00 | 22.00 | *** | *** | I/O | E | ** | OFF |
|  | Create New Step |  |  | SIG | 18.00 | 22.00 | *** | *** | I/O | E | ** | ON |
|  | Delete Current Step |  |  | SIG | 18.00 | 22.00 | *** | *** | I/O | E | ** | ON |
|  | Edit Step Function |  |  | SIG | 18.00 | 22.00 | *** | *** | *** | E | ** | ON |
|  |  |  |  | C/M | -5.40 | 10.00 | *** | *** | *** | E | ** | ON |
| 7 |  |  |  | SIG | -1.00 | 22.00 | *** | *** | I/O | E | ** | ON |

Run  Select  Options  Install  Program  System

| STEP | NAME | PLT | TIME X | UNITS | LOLIMIT | HILIMIT | ACC | REJ | CMD | M | S | LOG |
|---|---|---|---|---|---|---|---|---|---|---|---|---|
| 1 | AUTOZERO | ATZ | 0.1\|1 | PSIG |  | 22.00 | *** | *** | I/O | E | ** | OFF |
| AUTOZERO | FILL | ISOLATE | OVERFILL |  | -1.00 | 2.00 | *** | *** | I/O | E | ** | OFF |
| STABILIZE | PRESS | LEAK | FLOW |  |  | .00 | *** | *** | I/O | E | ** | ON |
| FLOW TEST | PRESS CHG | EXHAUST | DELAY |  |  | .00 | *** | *** | *** | E | ** | ON |
| PRES START | PRES LOSS | WAIT | STOPWATCH |  |  | .00 | *** | *** | *** | E | ** | ON |
|  |  |  |  |  |  | .00 | *** | *** | I/O | E | ** | ON |

304

| Run | Select | Options | Install | Program | System | | | | | | | |
|---|---|---|---|---|---|---|---|---|---|---|---|---|
| STEP | NAME | PLT | TIME | X | UNITS | LOLIMIT | HILIMIT | ACC | REJ | CMD | M S | LOG |
| 1 | AUTOZERO | ATZ | 0.1 | 1 | PSIG | -1.00 | 22.00 | *** | *** | I/O | E ** | OFF |
| 2 | WAIT | WAI | 0.1 | 2 | C | | | *** | *** | *** | E ** | OFF |
| 3 | OVERFILL | OVF | 1.0 | 1 | PSIG | 18.00 | 22.00 | *** | *** | I/O | E ** | ON |
| 4 | FILL | FIL | 1.0 | 1 | PSIG | 18.00 | 22.00 | *** | *** | I/O | E ** | ON |
| 5 | ISOLATE | ISO | 0.1 | 1 | PSIG | 18.00 | 22.00 | *** | *** | I/O | E ** | ON |
| 6 | STABILIZE | STB | 1.0 | 1 | PSIG | 18.00 | 22.00 | *** | *** | I/O | E ** | ON |
| 7 | LEAK | LK | 2.5 | 1 | CC/M | -5.40 | 10.00 | *** | *** | *** | E ** | ON |
| 8 | EXHAUST | EXH | 1.0 | 1 | PSIG | -1.00 | 22.00 | *** | *** | I/O | E ** | ON |

*FIG. 8E*

| Run | Select | Options | Install | Program | System | | | | | | | |
|---|---|---|---|---|---|---|---|---|---|---|---|---|
| STEP | NAME | PLT | TIME | X | UNITS | LOLIMIT | HILIMIT | ACC | REJ | CMD | M S | LOG |
| 1 | AUTOZERO | ATZ | 0.1 | 1 | PSIG | -1.00 | 22.00 | *** | *** | I/O | E ** | OFF |
| 2 | WAIT | WAI | 0.1 | 2 | C | | | *** | *** | *** | E ** | OFF |
| 3 | WAIT | WAI | 0.1 | 2 | C | | | *** | *** | *** | E ** | OFF |
| 4 | OVERFILL | OVF | 1.0 | 1 | PSIG | 18.00 | 22.00 | *** | *** | I/O | E ** | ON |
| 5 | FILL | FIL | 1.0 | 1 | PSIG | 18.00 | 22.00 | *** | *** | I/O | E ** | ON |
| 6 | ISOLATE | ISO | 0.1 | 1 | PSIG | 18.00 | 22.00 | *** | *** | I/O | E ** | ON |
| 7 | STABILIZE | STB | 1.0 | 1 | PSIG | 18.00 | 22.00 | *** | *** | I/O | E ** | ON |
| 8 | LEAK | LK | 2.5 | 1 | CC/M | -5.40 | 10.00 | *** | *** | *** | E ** | ON |
| 9 | EXHAUST | EXH | 1.0 | 1 | PSIG | -1.00 | 22.00 | *** | *** | I/O | E ** | ON |

Run Select Options Install Program System

| STEP | NAME | PLT | TIME | X | UNITS | LOLIMIT | HILIMIT | ACC | REJ | CMD | M | S | LOG |
|---|---|---|---|---|---|---|---|---|---|---|---|---|---|
| 1 | AUTOZERO | ATZ | 0.1 | 1 | PSIG | -1.00 | 22.00 | *** | *** | I/O | E | ** | OFF |
| 2 | WAIT | WAI | 0.1 | 2 | C | | | *** | *** | *** | E | ** | OFF |
| 3 | WAIT | WAI | 0.1 | 2 | C | | | *** | *** | *** | E | ** | OFF |
| | | | | 1 | PSIG | 18.00 | 22.00 | *** | *** | I/O | E | ** | OFF |
| | | | | | PSIG | 18.00 | 22.00 | *** | *** | *** | E | ** | ON |
| | | | | | PSIG | 18.00 | 22.00 | *** | *** | *** | E | ** | ON |
| | | | | | PSIG | 18.00 | 22.00 | *** | *** | I/O | E | ** | ON |
| | | | | | CC/M | -5.40 | 10.00 | *** | *** | *** | E | ** | ON |
| | | | | | PSIG | -1.00 | 22.00 | *** | *** | I/O | E | ** | ON |

| AutoZero | OFF |
|---|---|
| Tare | OFF |
| Test Limits | OFF |
| Skip On Accept | OFF |
| Skip On Reject | OFF |
| Compensation | OFF |
| Calibration | OFF |
| Exhaust | OFF |
| Wait | ON |
| Stop Watch | ON |
| Math Step | OFF |

| Run | Select | Options | Install | Program | System |

| STEP | NAME | PLT | TIME | X | UNITS | LOLIMIT | HILIMIT | ACC | REJ | CMD | M | S | LOG |
|---|---|---|---|---|---|---|---|---|---|---|---|---|---|
| 1 | AUTOZERO | ATZ | 0.1 | 1 | PSIG | -1.00 | 22.00 | *** | *** | I/O | E | ** | OFF |
| 2 | WAIT | WAI | 0.1 | 2 | C | | | *** | *** | *** | E | ** | OFF |
| 3 | WAIT | WAI | 0.1 | 2 | C | | | *** | *** | *** | E | ** | OFF |
| | | | | 1 | PSIG | 18.00 | 22.00 | *** | *** | I/O | E | ** | OFF |

AutoZero  
Tare  
Test Limi  
Skip On A  
Skip On R  
Compensat  
Calibrati  
Exhaust  
Wait  
Stop Watc  
Math Step Equation B. (AB+C+D)E=F  322  324  326  328  330

| | Value | Type | Reg | Prog | Step | Channel | Value |
|---|---|---|---|---|---|---|---|
| A | 0.0000 | STEP | — | 01 | 02 | DEFAULT | Actual |
| B | -0.0010 | REG | 03 | — | — | — | Actual |
| C | 0.1000 | REG | 04 | — | — | — | Actual |
| D | 0.0000 | REG | 01 | — | — | — | Actual |
| E | 1.0000 | REG | 02 | — | — | — | Actual |
| F | -0.0001 | COMP | — | 01 | 03 | DEFAULT | Actual |

| Run | Select | Options | Install | Program | System |

| STEP | NAME | PLT | TIME | X | UNITS | LOLIMIT | HILIMIT | ACC | REJ | CMD | M | S | LOG |
|---|---|---|---|---|---|---|---|---|---|---|---|---|---|
| 1 | AUTOZERO | ATZ | 0.1 | 1 | PSIG | -1.00 | 22.00 | *** | *** | I/O | E | ** | OFF |
| 2 | WAIT | WAI | 0.1 | 2 | C | | | *** | *** | *** | E | ** | OFF |
| 3 | MATHSTEP B | WAI | 0.1 | 2 | C | | | *** | *** | *** | E | ** | OFF |
| 4 | OVERFILL | OVF | 1.0 | 1 | PSIG | 18.00 | 22.00 | *** | *** | I/O | E | ** | OFF |
| 5 | FILL | FIL | 1.0 | 1 | PSIG | 18.00 | 22.00 | *** | *** | I/O | E | ** | ON |
| 6 | ISOLATE | ISO | 0.1 | 1 | PSIG | 18.00 | 22.00 | *** | *** | I/O | E | ** | ON |
| 7 | STABILIZE | STB | 1.0 | 1 | PSIG | 18.00 | 22.00 | *** | *** | *** | E | ** | ON |
| 8 | LEAK | LK | 2.5 | 1 | CC/M | -5.40 | 10.00 | *** | *** | *** | E | ** | ON |
| 9 | EXHAUST | EXH | 1.0 | 1 | PSIG | -1.00 | 22.00 | *** | *** | I/O | E | ** | ON |

FIG. 8N — 334

| Run | Select | Options | Install | Program | System |

| STEP | NAME | PLT | TIME | X | UNITS | LOLIMIT | HILIMIT | ACC | REJ | CMD | M | S | LOG |
|---|---|---|---|---|---|---|---|---|---|---|---|---|---|
| 1 | AUTOZERO | ATZ | 0.1 | 1 | PSIG | -1.00 | 22.00 | *** | *** | I/O | E | ** | OFF |
| 2 | WAIT | WAI | 0.1 | 2 | C | | | *** | *** | I/O | E | ** | OFF |
| 3 | MATHSTEP B | WAI | 0.1 | 2 | PSIG | | | *** | *** | I/O | E | ** | OFF |
| 4 | OVERFILL | OVF | 1.0 | 1 | PSIG | 18.00 | 22.00 | *** | *** | I/O | E | ** | OFF |
| 5 | FILL | FIL | 1.0 | 1 | PSIG | 18.00 | 22.00 | *** | *** | I/O | E | ** | ON |
| 6 | ISOLATE | ISO | 0.1 | 1 | PSIG | 18.00 | 22.00 | *** | *** | I/O | E | ** | ON |
| 7 | STABILIZE | STB | 1.0 | 1 | PSIG | 18.00 | 22.00 | *** | *** | *** | E | ** | ON |
| 8 | LEAK | LK | 2.5 | 1 | CC/M | -5.40 | 10.00 | *** | *** | *** | E | ** | ON |
| 9 | EXHAUST | EXH | 1.0 | 1 | PSIG | -1.00 | 22.00 | *** | *** | I/O | E | ** | ON |

—336

```
<Screen Dump>
                       OUTPUTS
STEP  1  2  3  4  5  6  7  8  9 10 11 12 13 14
  1   . .C  .  .  .  .  .  .  .  .  .  .  .  .
  2   . .C  .  .  .  .  .  .  .  .  .  .  .  .
  3   . .C  .  .  .  .  .  .  .  .  .  .  .  .
  4   . .C .C  .  .  .  .  .  .  .  .  .  .  .
  5  .C .C  .  .  .  .  .  .  .  .  .  .  .  .
  6  .C  .  .  .  .  .  .  .  .  .  .  .  .  .
  7   .  .  .  .  .  .  .  .  .  .  .  .  .  .
  8   .  .  .  .  .  .  .  .  .  .  .  .  .  .
  9   . .C  .  .  .  .  .  .  .  .  .  .  .  .

A=Accept Marker
R=Reject Marker
C=Command Output
a=Accept Step Result Marker
r=Reject Step Result Marker
```

FIG. 9A

```
<Screen Dump>

ATTRIBUTES              STEPS
                   1  2  3  4  5  6  7  8  9

AutoZero          on  .  .  .  .  .  .  .  .
Tare               .  .  .  .  .  .  . on  .
Test Limits       on  .  . on on on on on on
Skip On Accept     .  .  .  .  .  .  .  .  .
Skip On Reject     .  .  .  .  .  .  .  .  .
Compensation       .  .  .  .  .  .  . on  .
Calibration        .  .  .  .  .  .  . on  .
Exhaust            .  .  .  .  .  .  .  . on
Wait               . on on  .  .  .  .  .  .
Stop Watch         .  .  .  .  .  .  .  .  .
Math Step          .  . on  .  .  .  .  .  .
```

$SR_9 + SR_{14} = L_a + L_b + 2 \cdot L_c$     [STEP 16]
$[SR_9 + SR_{14}] = SR_4 + 2 \cdot L_c$ $$\frac{[SR_9 + SR_{14}] - SR_4}{2} = L_c$$     [STEP 17]

$L_a = SR_9 - L_c$     [STEP 18]
$L_b = SR_{14} - L_c$     [STEP 19]

```
                              OUTPUTS
        STEP  1   2   3   4   5   6   7   8  9 10 11 12 13 14
        ┌  1  .  .C  .   .  .C  .C  .  .  .  .  .  .  .  .
        │  2  .  .   .   .  .C  .C  .  .  .  .  .  .  .  .
   400 ─┤  3  .C .   .C  .  .C  .C  .  .  .  .  .  .  .  .
        │  4  .C .   .C  .  .C  .C  .  .  .  .  .  .  .  .
        └  5  .C .C  .C  .C .C  .   .  .  .  .  .  .  .  .
        ┌  6  .  .C  .C  .C .C  .   .  .  .  .  .  .  .  .
        │  7  .  .   .C  .C .C  .   .  .  .  .  .  .  .  .
   402 ─┤  8  .C .   .C  .C .C  .   .  .  .  .  .  .  .  .
        │  9  .C .   .C  .C .C  .   .  .  .  .  .  .  .  .
        └ 10  .C .C  .C  .C .   .C  .  .  .  .  .  .  .  .
        ┌ 11  .C .C  .   .C .   .C  .  .  .  .  .  .  .  .
        │ 12  .C .C  .   .  .   .C  .  .  .  .  .  .  .  .
   404 ─┤ 13  .C .C  .C  .  .   .C  .  .  .  .  .  .  .  .
        │ 14  .C .C  .C  .  .   .C  .  .  .  .  .  .  .  .
        └ 15  .C .C  .C  .C .   .C  .  .  .  .  .  .  .  .
```

A=Accept Marker
R=Reject Marker
C=Command Output
a=Accept Step Result Marker
r=Reject Step Result Marker

*FIG. 11A*

```
ATTRIBUTES                          STEPS
                  1  2  3  4  5  6  7  8  9 10 11 12 13 14 15 16 17 18 19
AutoZero          .  .  .  .  .  .  .  .  .  .  .  .  .  .  .  .  .  .  .
Tare              .  .  . on  .  .  .  . on  .  .  .  . on  .  .  .  .  .
Test Limits      on on on on on on on on on on on on on on on  . on on on
Skip On Accept    .  .  .  .  .  .  .  .  .  .  .  .  .  .  .  .  .  .  .
Skip On Reject    .  .  .  .  .  .  .  .  .  .  .  .  .  .  .  .  .  .  .
Compensation      .  .  . on  .  .  .  . on  .  .  .  . on  .  .  .  .  .
Calibration       .  .  . on  .  .  .  . on  .  .  .  . on  .  .  .  .  .
Exhaust           .  .  .  . on  .  .  .  . on  .  .  .  . on  .  .  .  .
Wait              .  .  .  .  .  .  .  .  .  .  .  .  .  .  .  . on on on on
Stop Watch        .  .  .  .  .  .  .  .  .  .  .  .  .  .  .  .  .  .  .
Math Step         .  .  .  .  .  .  .  .  .  .  .  .  .  .  .  . on on on on
```

*FIG. 11B*

Run  Select  Options  Install  Program  System

| STEP | NAME | PLT | TIME | X | UNITS | LOLIMIT | HILIMIT | ACC | REJ | CMD | M | S | LOG |
|---|---|---|---|---|---|---|---|---|---|---|---|---|---|
| 1 | FILL | FIL | 1.0 | 1 | PSIG | 18.00 | 22.00 | *** | *** | I/O | E | ** | OFF |
| 2 | ISOLATE | ISO | 0.1 | 1 | PSIG | 18.00 | 22.00 | *** | *** | I/O | E | ** | OFF |
| 3 | STABILIZE | STB | 1.0 | 1 | PSIG | 18.00 | 22.00 | *** | *** | I/O | E | ** | ON |
| 4 | LEAK | LK | 2.5 | 1 | CC/M | -5.40 | 10.00 | *** | *** | I/O | E | ** | ON |
| 5 | EXHAUST | EXH | 1.0 | 1 | PSIG | -1.00 | 22.00 | *** | *** | I/O | E | ** | OFF |
| 6 | FILL | FIL | 1.0 | 1 | PSIG | 18.00 | 22.00 | *** | *** | I/O | E | ** | OFF |
| 7 | ISOLATE | ISO | 0.1 | 1 | PSIG | 18.00 | 22.00 | *** | *** | I/O | E | ** | OFF |
| 8 | STABILIZE | STB | 1.0 | 1 | PSIG | 18.00 | 22.00 | *** | *** | I/O | E | ** | ON |
| 9 | LEAK | LK | 2.5 | 1 | CC/M | -5.40 | 10.00 | *** | *** | I/O | E | ** | ON |
| 10 | EXHAUST | EXH | 1.0 | 1 | PSIG | -1.00 | 22.00 | *** | *** | I/O | E | ** | OFF |
| 11 | FILL | FIL | 1.0 | 1 | PSIG | 18.00 | 22.00 | *** | *** | I/O | E | ** | OFF |
| 12 | ISOLATE | ISO | 0.1 | 1 | PSIG | 18.00 | 22.00 | *** | *** | I/O | E | ** | OFF |
| 13 | STABILIZE | STB | 1.0 | 1 | PSIG | 18.00 | 22.00 | *** | *** | I/O | E | ** | ON |
| 14 | LEAK | LK | 2.5 | 1 | CC/M | -5.40 | 10.00 | *** | *** | I/O | E | ** | ON |
| 15 | EXHAUST | EXH | 1.0 | 1 | PSIG | -1.00 | 22.00 | *** | *** | I/O | E | ** | OFF |

| Run | Select | Options | Install | Program | System | | | | | | | |
|---|---|---|---|---|---|---|---|---|---|---|---|---|
| STEP | NAME | PLT | TIME | X | UNITS | LOLIMIT | HILIMIT | ACC | REJ | CMD | M S | LOG |
| 5 | EXHAUST | EXH | 1.0 | 1 | PSIG | -1.00 | 22.00 | **** | **** | I/O | E ** | OFF |
| 6 | FILL | FIL | 1.0 | 1 | PSIG | 18.00 | 22.00 | **** | **** | I/O | E ** | OFF |
| 7 | ISOLATE | ISO | 0.1 | 1 | PSIG | 18.00 | 22.00 | **** | **** | I/O | E ** | OFF |
| 8 | STABILIZE | STB | 1.0 | 1 | PSIG | 18.00 | 22.00 | **** | **** | I/O | E ** | ON |
| 9 | LEAK | LK | 2.5 | 1 | CC/M | -5.40 | 10.00 | **** | **** | I/O | E ** | ON |
| 10 | EXHAUST | EXH | 1.0 | 1 | PSIG | -1.00 | 22.00 | **** | **** | I/O | E ** | OFF |
| 11 | FILL | FIL | 1.0 | 1 | PSIG | 18.00 | 22.00 | **** | **** | I/O | E ** | OFF |
| 12 | ISOLATE | ISO | 0.1 | 1 | PSIG | 18.00 | 22.00 | **** | **** | I/O | E ** | OFF |
| 13 | STABILIZE | STB | 1.0 | 1 | PSIG | 18.00 | 22.00 | **** | **** | I/O | E ** | ON |
| 14 | LEAK | LK | 2.5 | 1 | CC/M | -5.40 | 10.00 | **** | **** | I/O | E ** | ON |
| 15 | EXHAUST | EXH | 1.0 | 1 | PSIG | -1.00 | 22.00 | **** | **** | I/O | E ** | OFF |
| 16 | MATHSTEP A | WAI | 0.1 | 1 | PSIG | | | **** | **** | *** | E ** | OFF |
| 17 | MATHSTEP E | WAI | 0.1 | 1 | PSIG | -.10 | 22.00 | **** | **** | *** | E ** | OFF |
| 18 | MATHSTEP G | WAI | 0.1 | 1 | PSIG | -1.00 | 22.00 | **** | **** | *** | E ** | OFF |
| 19 | MATHSTEP G | WAI | 0.1 | 1 | PSIG | -1.00 | 22.00 | **** | **** | *** | E ** | OFF |

Run  Select  Options  Install  Program  System

| STEP | NAME | PLT | TIME | X | UNITS | LOLIMIT | HILIMIT | ACC | REJ | CMD | M | S | LOG |
|---|---|---|---|---|---|---|---|---|---|---|---|---|---|
| 5 | EXHAUST | EXH | 1.0 | 1 | PSIG | -1.00 | 22.00 | *** | *** | I/O | E | ** | OFF |
| 6 | FILL | FIL | 1.0 | 1 | PSIG | 18.00 | 22.00 | *** | *** | I/O | E | ** | OFF |
| 7 | ISOLATE | ISO | 0.1 | 1 | PSIG | 18.00 | 22.00 | *** | *** | I/O | E | ** | OFF |
| 8 | STABILIZE | STB | 1.0 | 1 | PSIG | 18.00 | 22.00 | *** | *** | I/O | E | ** | ON |
| 9 | LEAK | LK | 2.5 | 1 | CC/M | -5.40 | 10.00 | *** | *** | I/O | E | ** | ON |
| 10 | EXHAUST | EXH | 1.0 | 1 | PSIG | -1.00 | 22.00 | *** | *** | I/O | E | ** | OFF |
| 11 | FILL | FIL | 1.0 | 1 | PSIG | 18.00 | 22.00 | *** | *** | I/O | E | ** | OFF |
| 12 | ISOLATE | ISO | 0.1 | 1 | PSIG | 18.00 | 22.00 | *** | *** | I/O | E | ** | OFF |
| 13 | STABILIZE | STB | 1.0 | 1 | PSIG | 18.00 | 22.00 | *** | *** | I/O | E | ** | ON |
| 14 | LEAK | LK | 2.5 | 1 | CC/M | -5.40 | 10.00 | *** | *** | I/O | E | ** | ON |
| 15 | EXHAUST | EXH | 1.0 | 1 | PSIG | -1.00 | 22.00 | *** | *** | I/O | E | ** | OFF |
| 16 | MATHSTEP A | WAI | 0.1 | 1 | PSIG | | | *** | *** | I/O | E | ** | OFF |
| 17 | MATHSTEP E | WAI | 0.1 | 1 | PSIG | -.10 | 22.00 | *** | *** | I/O | E | ** | OFF |
| 18 | MATHSTEP G | WAI | 0.1 | 1 | PSIG | -1.00 | 22.00 | *** | *** | I/O | E | ** | OFF |
| 19 | MATHSTEP G | WAI | 0.1 | 1 | PSIG | -1.00 | 22.00 | *** | *** | I/O | E | ** | OFF |

Equation G. A-B-C-D-E=F

|   | Value | Type | Reg | Prog | Step | Channel | Value |
|---|---|---|---|---|---|---|---|
| A | 0.0000 | STEP | — | 01 | 09 | DEFAULT | Actual |
| B | 0.0000 | STEP | — | 01 | 17 | DEFAULT | Actual |
| C | 0.0000 | REG | 01 | — | — | — | Actual |
| D | 0.0000 | REG | 01 | — | — | — | Actual |
| E | 0.0000 | REG | 01 | — | — | — | Actual |
| F | 0.0000 | STEP | — | 01 | 18 | DEFAULT | Actual |

*FIG. 12E*

| STEP | NAME | PLT | TIME | X | UNITS | LOLIMIT | HILIMIT | ACC | REJ | CMD | M | S | LOG |
|---|---|---|---|---|---|---|---|---|---|---|---|---|---|
| 5 | EXHAUST | EXH | 1.0 | 1 | PSIG | -1.00 | 22.00 | *** | *** | I/O | E | ** | OFF |
| 6 | FILL | FIL | 1.0 | 1 | PSIG | 18.00 | 22.00 | *** | *** | I/O | E | ** | OFF |
| 7 | ISOLATE | ISO | 0.1 | 1 | PSIG | 18.00 | 22.00 | *** | *** | I/O | E | ** | OFF |
| 8 | STABILIZE | STB | 1.0 | 1 | PSIG | 18.00 | 22.00 | *** | *** | I/O | E | ** | ON |
| 9 | LEAK | LK | 2.5 | 1 | CC/M | -5.40 | 10.00 | *** | *** | I/O | E | ** | ON |
| 10 | EXHAUST | EXH | 1.0 | 1 | PSIG | -1.00 | 22.00 | *** | *** | I/O | E | ** | OFF |
| 11 | FILL | FIL | 1.0 | 1 | PSIG | 18.00 | 22.00 | *** | *** | I/O | E | ** | OFF |
| 12 | ISOLATE | ISO | 0.1 | 1 | PSIG | 18.00 | 22.00 | *** | *** | I/O | E | ** | OFF |
| 13 | STABILIZE | STB | 1.0 | 1 | PSIG | 18.00 | 22.00 | *** | *** | I/O | E | ** | ON |
| 14 | LEAK | LK | 2.5 | 1 | CC/M | -5.40 | 10.00 | *** | *** | I/O | E | ** | ON |
| 15 | EXHAUST | EXH | 1.0 | 1 | PSIG | -1.00 | 22.00 | *** | *** | I/O | E | ** | OFF |
| 16 | MATHSTEP A | WAI | 0.1 | 1 | PSIG | | | *** | *** | *** | E | ** | OFF |
| 17 | MATHSTEP E | WAI | 0.1 | 1 | PSIG | -.10 | 22.00 | *** | *** | *** | E | ** | OFF |
| 18 | MATHSTEP G | WAI | 0.1 | 1 | PSIG | -1.00 | 22.00 | *** | *** | *** | E | ** | OFF |
| 19 | MATHSTEP G | WAI | 0.1 | 1 | PSIG | -1.00 | 22.00 | *** | *** | *** | E | ** | OFF |

Equation G. A-B-C-D-E=F

| | Value | Type | Reg | Prog | Step | Channel | Value |
|---|---|---|---|---|---|---|---|
| A | 0.00000 | STEP | — | 01 | 14 | DEFAULT | Actual |
| B | 0.00000 | STEP | — | 01 | 17 | DEFAULT | Actual |
| C | 0.00000 | REG | 01 | — | — | — | Actual |
| D | 0.00000 | REG | 01 | — | — | — | Actual |
| E | 0.00000 | REG | 01 | — | — | — | Actual |
| F | 0.00000 | STEP | — | 01 | 19 | DEFAULT | Actual |

*FIG. 12F*

LEAK TESTER WITH FLEXIBLE EQUATION CAPABILITIES

BACKGROUND OF THE INVENTION

1. Field of the Invention

The invention relates to methods and an apparatus for performing leak testing, more particularly towards an improved method of leak testing incorporating programmable inputs and outputs.

2. Description of the Related Art

Systems for performing leak testing are well known to the art. Such systems are used, for example, to test automobile engine blocks and other components that are expected to have no or low leakage. These leak testing systems are often used on an assembly line, so they are preferably highly automated. That is, a new test piece is installed, tested, and removed, with little user programming and little user intervention. Such systems are described, for example, in U.S. Pat. No. 4,272,985 to Rapson, et al., issued Jun. 16, 1981; and U.S. Pat. No. 3,800,586 to Delatorre, et al., issued Apr. 2, 1974, both of which are hereby incorporated by reference.

A variety of types of leak tests are also well known. These include a basic gauge pressure decay leak test in which a test item is pressurized, allowed to stabilize for a certain period of time or until a certain pressure is reached, and then tested for leakage. Other tests include leakage tests based on differential pressure decay between a reference part and a test part; a mass flow sensor test which measures the heat loss of air passing over an element; a back pressure flow test which measures the back pressure caused by restrictions within a test part; a pressure change test; and a pressure/vacuum chamber measurement test in which the test part is placed in a sealed chamber.

But for all of these leak testing techniques, flexibility is highly desirable in the leak tester. Generally, for each application of leak testing, there may be some slight peculiarities or differences unique to that particular application. The ability to adapt to these differences is very important in a leak tester.

For example, in a basic gauge pressure decay leak test, when a test item is pressurized, the change in pressure causes an adiabatic effect. When the part is pressurized, the gas heats up, but the gas is then cooled by thermal conduction to the test piece. But because the pressure of gas is also dependent on its temperature, the pressure decreases even though the test piece has been sealed. This decrease in pressure is further dependent on the temperature of the test piece. These changes in pressure are taken into account in a basic leak test. To do so, however, generally a compensation value and a calibration value are provided in a basic leak test. For example, refer to FIG. 1A. In that figure, the test piece is pressurized for a fill period 20, and then allowed to stabilize for a stabilize period 22. During this stabilization period 22, the pressure is seen to decrease as the gas is cooled by the test part. At the beginning of a test period 24, a reference point known as a "tare" is set, and then at the end of the test period 24, the difference between the resulting pressure and the tare is recorded as the compensation value. This compensation value compensates for the pressure drop that occurs within a part that is not leaking.

Turning to FIG 1B, shown is the setting of a calibration value using a calibration orifice. In this case, a calibration orifice is provided with a known leak to determine a resulting pressure drop based on that known leak. Beginning with a fill period 26, the stabilization period 28 is entered, and the tare is set at the beginning of a test period 30. In this case, the pressure drop between the tare and the end of the test period 30 is greater than the compensation value. The calibration value thus equals whatever increase in pressure drop occurs over and above the compensation value.

But as will be appreciated in FIG. 1B, if the test part is colder than a zero leak master test part, the pressure drop during the test period 24 will be even greater, because the gas is even further cooled. Therefore, that compensation value can also be dependent on the temperature of the test part.

One technique in leak testing provides a temperature sensor that determines the temperature of the test part through its infrared radiation, and adjusts the compensation value based on that temperature. Historically, a different compensation value was provided depending on what temperature range a test part fell into. An alternative, however, is to use a straight-line adjustment to the compensation value through an initial compensation value and a slope. Then the compensation value is provided dependent on the temperature. This is further illustrated, and discussed below, in conjunction with FIGS. 4 and 5.

These temperature-based compensation techniques illustrate a situation in which flexibility in the tester and its programmable features is highly desirable. One would not necessarily want to hard program into the tester the ability to provide straight-line compensation, but the ability of the tester to provide this straight-line compensation is nevertheless desirable.

Another example of such a situation involves a part which includes two chambers that could have leakage between the chambers, such as in the cylinders of an engine. Generally, it can be difficult to determine the leakage rates of each of the cylinders, as well as the "interwall" leakage rates, this determination requiring a series of calculations. Again, it is desirable that the tester be able to automatically determine these leakage rates.

SUMMARY OF THE INVENTION

Therefore, according to the invention, a programmable leak tester is provided that includes standard steps for use in leak testing, such as autozero, fill, overfill, isolation, stabilization test, and exhaust, but the leak tester according to the invention further includes the capability to incorporate a "math step," in which constants, the outputs of certain of these other steps, or other variables are provided as inputs, and the "math step" outputs a compensation value, a calibration value, a step result, or a register value. Further, a variety of equations can be used in this math step, and multiple math steps can be used, providing for improved flexibility in the set up of a leak testing system.

These math steps are implemented in a standard tester program to provide a linear compensation based on temperature, to determine interwall leakage between two chambers of a test piece, and to provide a closed test piece pressure rise temperature compensation.

BRIEF DESCRIPTION OF THE DRAWINGS

A better understanding of the present invention can be obtained when the following detailed description of the preferred embodiment is considered in conjunction with the following drawings, in which:

FIGS. 8A–8N are screen captures illustrating the program of the equation step for a temperature compensated leak test according to the invention;

FIGS. 9A and 9B are illustrations of the output controls and step attributes of the programs of FIGS. 8A–8N;

FIGS. 11A and 11B are output and step attribute diagrams illustrating the output controls and the attributes of the steps for the program of FIGS. 12A–12F;

FIGS. 12A–12F are screen captures illustrating the programming of a series of math steps for determining interwall leakage rate according to the invention;

DETAILED DESCRIPTION OF THE PREFERRED EMBODIMENT

Figure 1A:
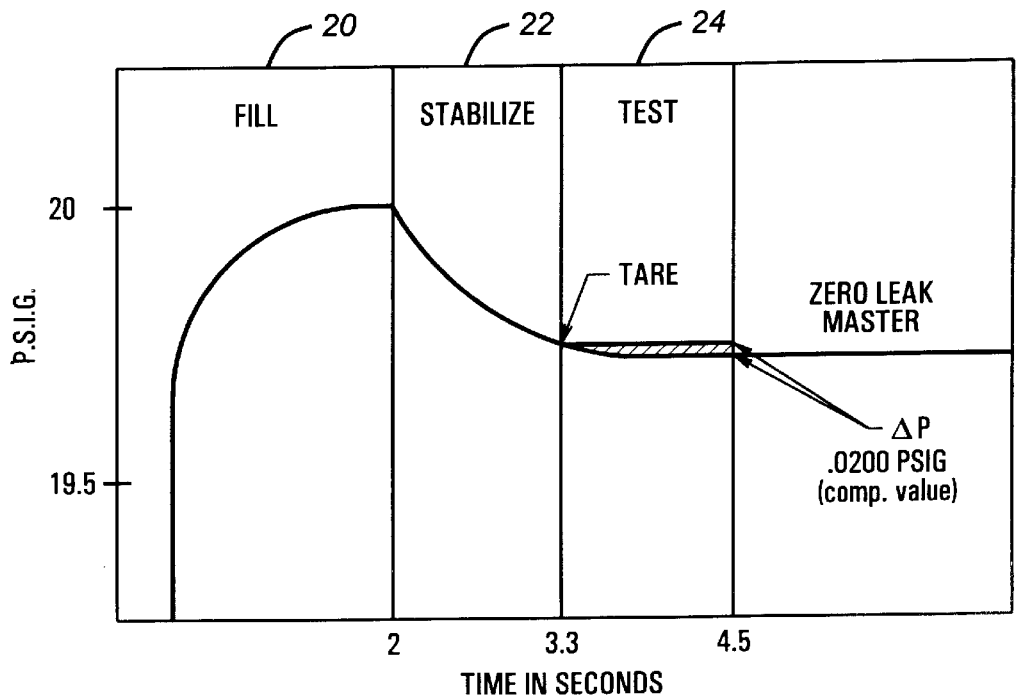
FIGS. 1A and 1B are pressure versus time diagrams in a leak test illustrating the need for compensation and calibration values for leak testing.
Figure 1B:
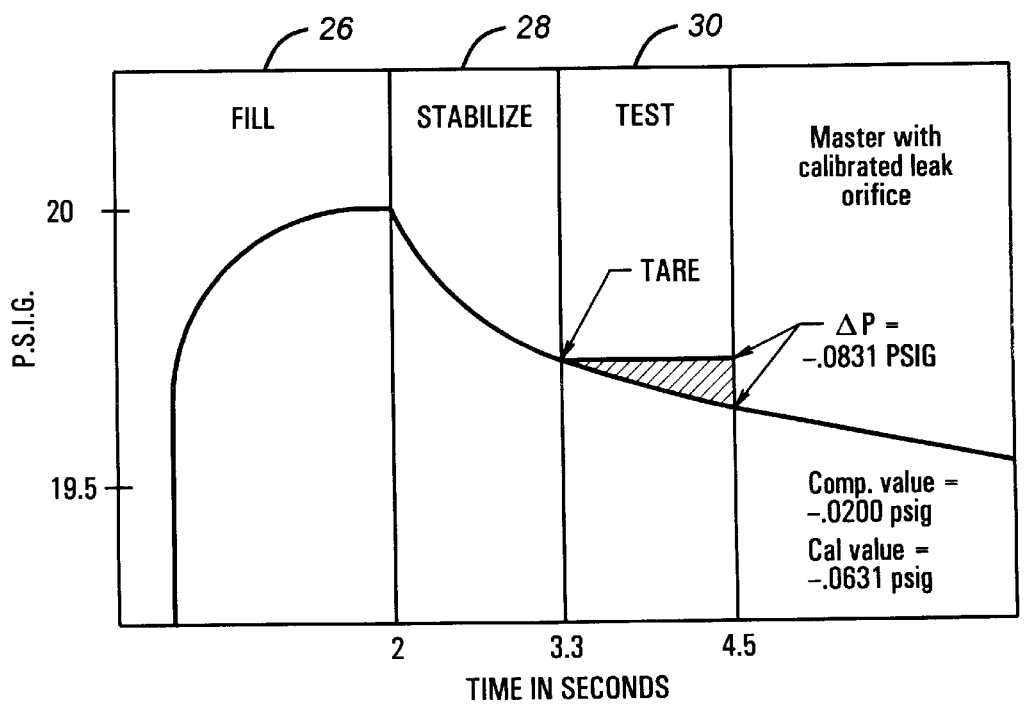
Figure 3:
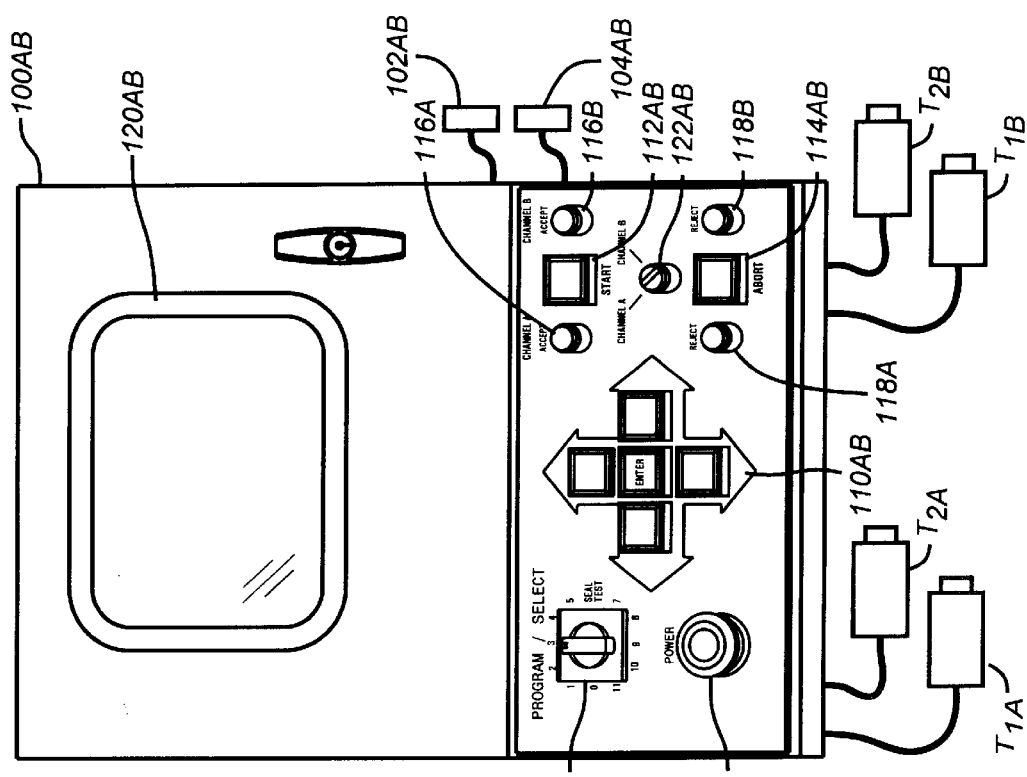
FIGS. 2 and 3 are illustrations of leak testers in which the equation step according to the invention is implemented.
Figure 2:
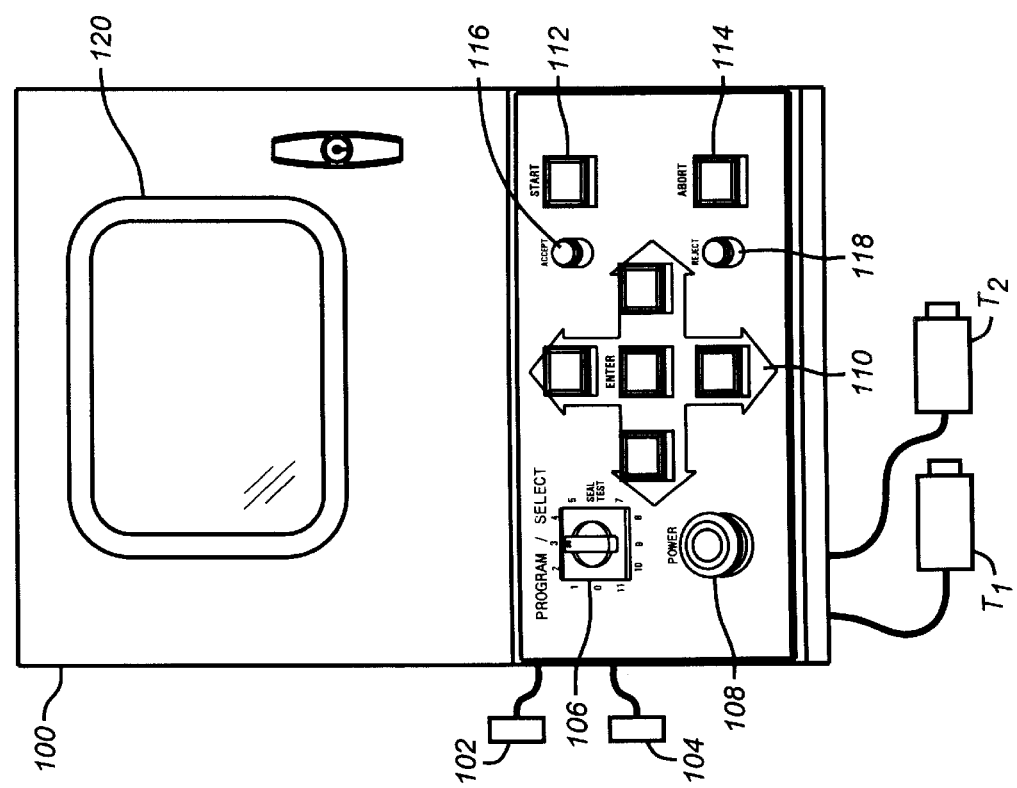

Turning to FIGS. 2 and 3, illustrated are typical leak testers used to implement the improved, flexible leak testing according to the invention. In FIG. 2, shown is a single channel leak tester 100 that includes a variety of components that allows it to efficiently test for leaks in an automated process. This includes programmable inputs 102 and outputs 104, which are essentially on/off switches that interact with the program of the leak tester 100. Further, a program select 106 allows the user to quickly select a particular program to use to test an item. A power button 108 turns the leak tester on and off, and a keypad 110 is used to program the leak tester 100 using a display 120. Certain aspects of this programming are further discussed below in conjunction with FIGS. 8A–14. A start 112 and an abort button 114 allow the user to quickly start and stop the selected leak tests, and an accept lamp 116 and reject lamp 118 display to the user whether the current leak test failed. Further, transducers $T_1$ and $T_2$ allow for pressure (and alternatively, for example, temperature) sensing. The leak tester 100 also preferably includes a microprocessor and memory (not shown) for storing its programming, and input and output ports and analog-digital converters for external communication and control.

An alternative leak tester 100AB is shown in FIG. 3. This leak tester 100AB is very similar to the leak tester 100, but includes a channel A and a channel B. It includes components 102AB–120AB, which correspond to the components 102 and 120 of the leak tester 100 of FIG. 2. Further, however, a channel select switch 122AB allows the user to select which particular channel is being programmed, started, or stopped. Further, each channel includes its own channel accept lamps 116A and 116B and reject lamps 118A and 118B. Each channel also includes its own transducers $T_{1A}$ and $T_{2A}$ and $T_{1B}$ and $T_{2B}$.

The leak tester 100 or the leak tester 100AB is preferably a 4000 series leak tester from Uson L. P. of Houston, Tex. The ability to provide programmable inputs and outputs for math steps as discussed below, however, can be further applied to other leak testers.

Figure 4:
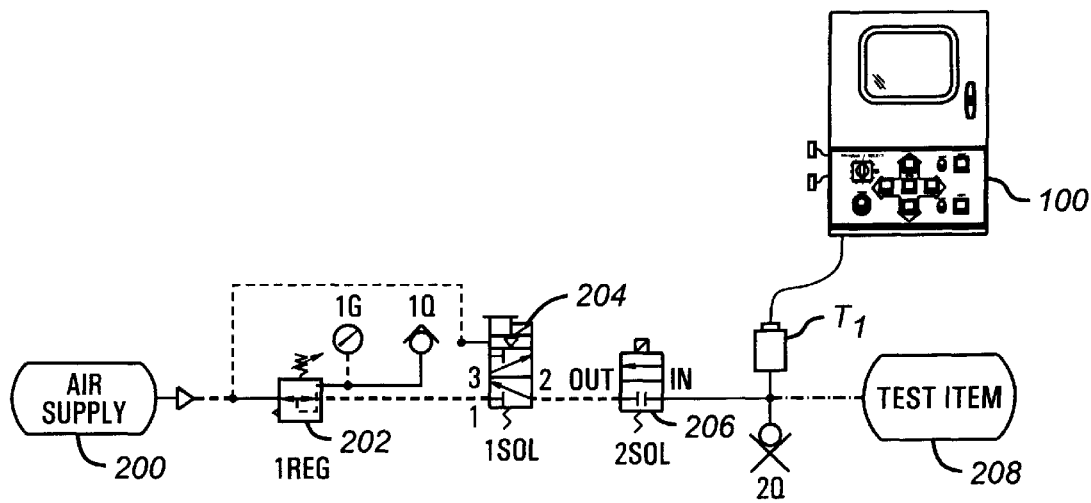
FIG. 4 is a diagram illustrating flow in a basic leak test according to the invention.

Turning to FIG. 4, shown is the leak tester 100 being used in a basic gauge pressure decay leak test configuration. In this configuration, an air supply 200 is connected through a regulator 202 to a 3-way valve 204, and then to an on/off valve 206. This valve is in turn connected to a test item 208.

In operation, a leak test is typically conducted as follows. First, the test item 208 is optionally over-pressurized from the air supply 200 by directly connecting the air supply 200 through the 3-way valve 204, through the on/off valve 206, and to the test item 208. Of note, the opening and closing of all of these valves 204 and 206 is controlled by the tester 100, preferably through the use of the output controls 104. Then, the 3-way valve 204 is switched such that the air supply is connected through the on/off valve 206 via the regulator 202. This provides a regulated pressure supply, such as 20 psig, to the test item. After the pressure is stabilized for a few seconds, the on/off valve 206 is then closed, and the test item 208 is allowed to stabilize for a few seconds until the pressure drops to a certain amount (as the heat of the gas is absorbed by the test part). The pressure is sensed by the transducer $T_1$ and recorded by the software of the tester 100 as the tare value. The pressure then continues to drop by a predetermined value, as further heat is absorbed by the test part, and the resulting value is recorded. The pressure drop between the tare value and the final value is the pressure drop used for determining whether the part is leaking. If the pressure drop exceeds the compensation value by a predetermined amount, it is determined that the part is leaking.

Figure 5:
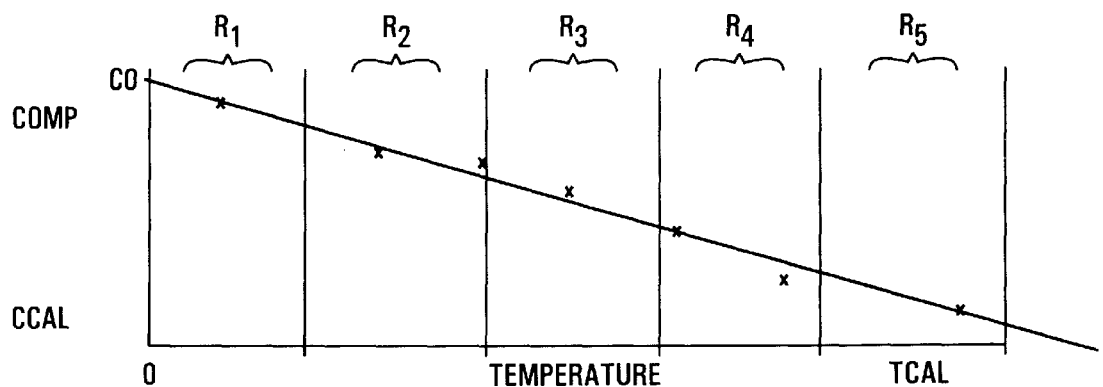
FIGS. 5 and 6 are alternative temperature compensation techniques that can be implemented in a leak tester.
Figure 6:
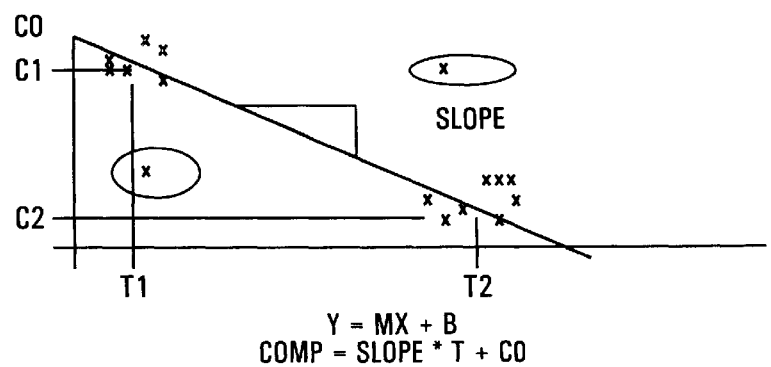

Turning to FIGS. 5 and 6, however, it is seen that the appropriate compensation value COMP is dependent upon temperature. If the temperature of the test item 208 is higher, less heat in the compressed gas is lost to the test item 208 during the stabilization period. Therefore, at the end of the stabilization period in a non-leaking test item 208, as the temperature increases, the pressure will drop less and less. The converse is also true. In a very cool part, even after the stabilization period, the pressure will continue to fall more rapidly because the gas is being cooled by the test item 208 itself.

Therefore, temperature compensation is an option. Referring to FIG. 5, it is seen how the compensation value varies with temperature. In older style testers, typically the temperature was measured from a transducer, such as the transducer $T_2$ of FIG. 2, and then appropriate compensation was chosen dependent upon which temperature range $R_1$–$R_5$ the measured temperature fell into. A fixed compensation was chosen for each particular range.

Referring to FIG. 6, however, it is seen that generally the compensation is linear over temperature, so if the appropriate compensation is determined through testing at a first temperature and then the appropriate compensation is determined at a second temperature, one can use a line whose slope is equal to the difference $$\frac{C_2 - C_1}{T_2 - T_1}$$

to determine an appropriate compensation value. That is, $$COMP(T) = \frac{C_2 - C_1}{T_2 - T_1} T + C_0$$

Figure 7:
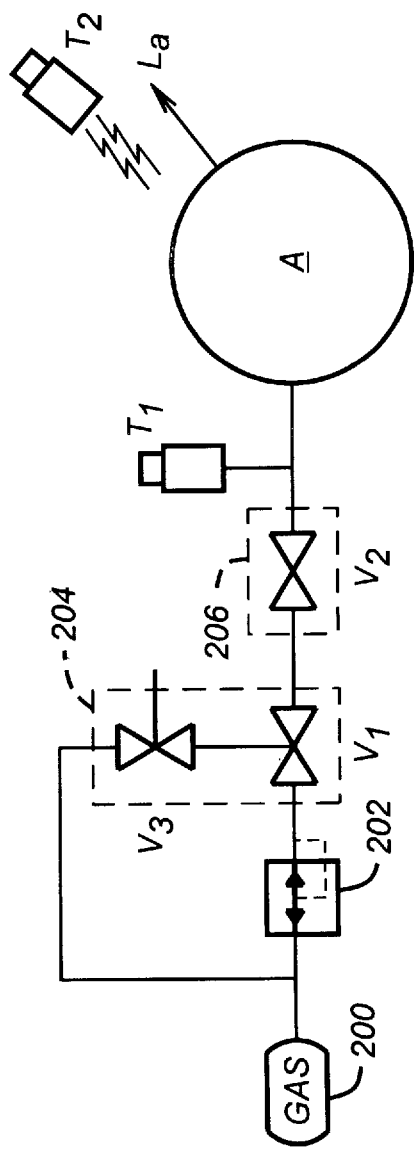
FIG. 7 is a flow diagram illustrating the use of pressure and temperature transducers in a temperature compensated leak test according to the invention.

Turning to FIG. 7, shown is a flow diagram of valves used for the testing using temperature compensation either according to FIG. 5 or FIG. 6. Three valves are shown, $V_1$, $V_2$, and $V_3$. Gas is provided from a gas supply 200 through the regulator 202 to a valve 204, which includes the logical valves $V_1$ and $V_3$. Logical value $V_2$ corresponds to the physical valve 206. $V_1$ and $V_3$ are logical valves corresponding to the physical valve 204 of FIG. 4. In FIG. 7, when $V_3$ is deenergized, it couples $V_1$ to an exhaust port, and when $V_1$ is deenergized it couples $V_2$ to $V_3$. $V_2$, when energized allows flow, and when deenergized blocks flow. The appropriate activation and deactivation of the valves $V_1$, $V_2$, and $V_3$ is further discussed below in conjunction with FIG. 9A.

The transducer $T_1$ senses the pressure within a test part A, which has a leak rate $L_a$. Further, a transducer $T_2$ senses the temperature of the test part A.

Figures 8A, 8B:
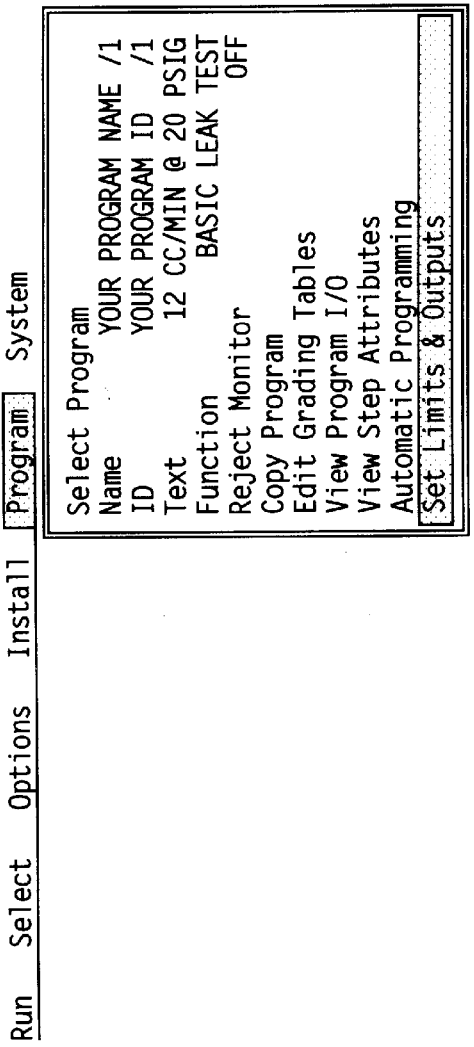

Turning to FIGS. 8A–8N, shown is a sequence for programming a math step according to the invention such that the compensation value used for leak testing is linearly dependent on the temperature returned by the transducer $T_2$.

In FIG. 8A, shown is a command menu displayed on the display 120. The pull-down "program" menu has been selected for setting limits and outputs for the particular program, here a basic leak test. When this is activated, a screen according to FIG. 8B is shown. FIG. 8B illustrates a standard leak testing program 300 that would be used without a temperature transducer $T_2$. Seven steps are illustrated in the program of FIG. 8B. First is an autozero step in which the pressure returned by the transducer $T_1$ is zeroed by the tester 100, thus providing a constant base line even if the ambient pressure were to shift slightly or the transducer $T_1$ were to drift over time. Proceeding to step 2, in an overfill step, $V_3$ is deenergized to couple the gas 200 to $V_1$, and $V_1$ is deenergized to couple $V_2$ to $V_3$. Further, $V_2$ is energized to allow the high pressure gas to pass into the test part A. This quickly fills the test part A with high pressure gas.

Proceeding to step 3, shown is a one-second fill step. In this step, the valve $V_1$ is switched from coupling $V_2$ to $V_3$ to coupling $V_2$ to the regulator 202. This provides gas of a steady pressure, such as 20 psig, to the test part A, filling it to a known pressure. In a next step, step 4, the test part A is isolated from the supply by closing the valve $V_2$. Then, in a step 5, the pressure within the test part is allowed to stabilize for about one second. During this stabilization period, the pressure will generally decrease because the test part A is absorbing heat from the pressurized gas within the test part A. The pressure will also decrease because of a leak $L_a$ if a leak is present in the test part. Turning to a step 6, the part is tested for the leak $L_a$. At the initiation of this 2.5 pressure drop. After the leak test begins, 2.5 seconds are allowed to pass, and it is determined whether a test part A is acceptable, depending on how much the pressure drop exceeds any compensation value. Also during the leak step 6, and the stabilization step 5, the valve $V_3$ is deenergized and the valve $V_1$ is deenergized so that when the valve $V_2$ is again open, it will allow the pressure to exhaust from the test part A.

So the program 300 that appears in step 8B is a standard basic leak test program that first provides an autozero function, which is used to vent the test part following a part clamp and seal; overfill and fill functions, which pressurize the part; an isolate function in which the part is isolated from the rest of the system; stabilize and leak functions in which the pressure of the part is allowed to stabilize and then the pressure decrease is checked during the leak step; and then the exhaust function. These seven steps form a basic leak testing protocol.

This program 300 is modified according to the invention to create the variable compensation according to FIG. 5. First, the temperature transducer $T_2$ must be read, and the appropriate compensation value calculated based on that temperature. Then, that compensation value is used in the leak step, step 6 of FIG. 8B.

Proceeding to FIG. 8C, the beginning of the process of programming this math step is shown. At FIG. 8C, a new step is created after the initial autozero step. In FIG. 8D, this new step is specified to be a wait step. A wait step essentially does nothing, and turning to FIG. 8E it is seen that this wait step is for only one tenth of a second, so this is actually a placeholder step. Proceeding to FIG. 8F, the procedures of FIGS. 8B, 8C, 8D, and 8E are repeated, so two "wait" steps.

Referring to FIG. 8E, it is seen that in the "x" column, the transducer $T_2$ is selected rather than transducer $T_1$. By selecting transducer $T_2$ rather than transducer $T_1$, the "result" of steps 2 and 3 will be the value in ° C. of that transducer. Referring to column M within the table of FIG. 8E, that column specifies what will be the result of the step measurement process. All of the columns presently have an "E" in them, indicating that the last reading collected from the specified transducer is used as the step result. Other possibilities include a range value, which is the signed difference between the high and low readings collected during the step; a change value, which is the unsigned difference between the high and low readings collected during the step; a low value which is the lowest reading collected during the step; and a high value, which is the highest reading collected during the step. The result of step 2 will be used by a math step that is to be implemented in step 3 as illustrated in FIGS. 8G–8N below. The needed result is the temperature from the transducer $T_2$, so specifying transducer $T_2$ and the end of step value of $T_2$ as the step result is appropriate in step 2 for use in step 3. As can be seen in FIG. 6, this is appropriate because the transducer $T_2$ provides temperature in degrees centigrade, where the $T_2$ transducer has been spanned and calibrated to return that value.

Figures 8G, 8H:
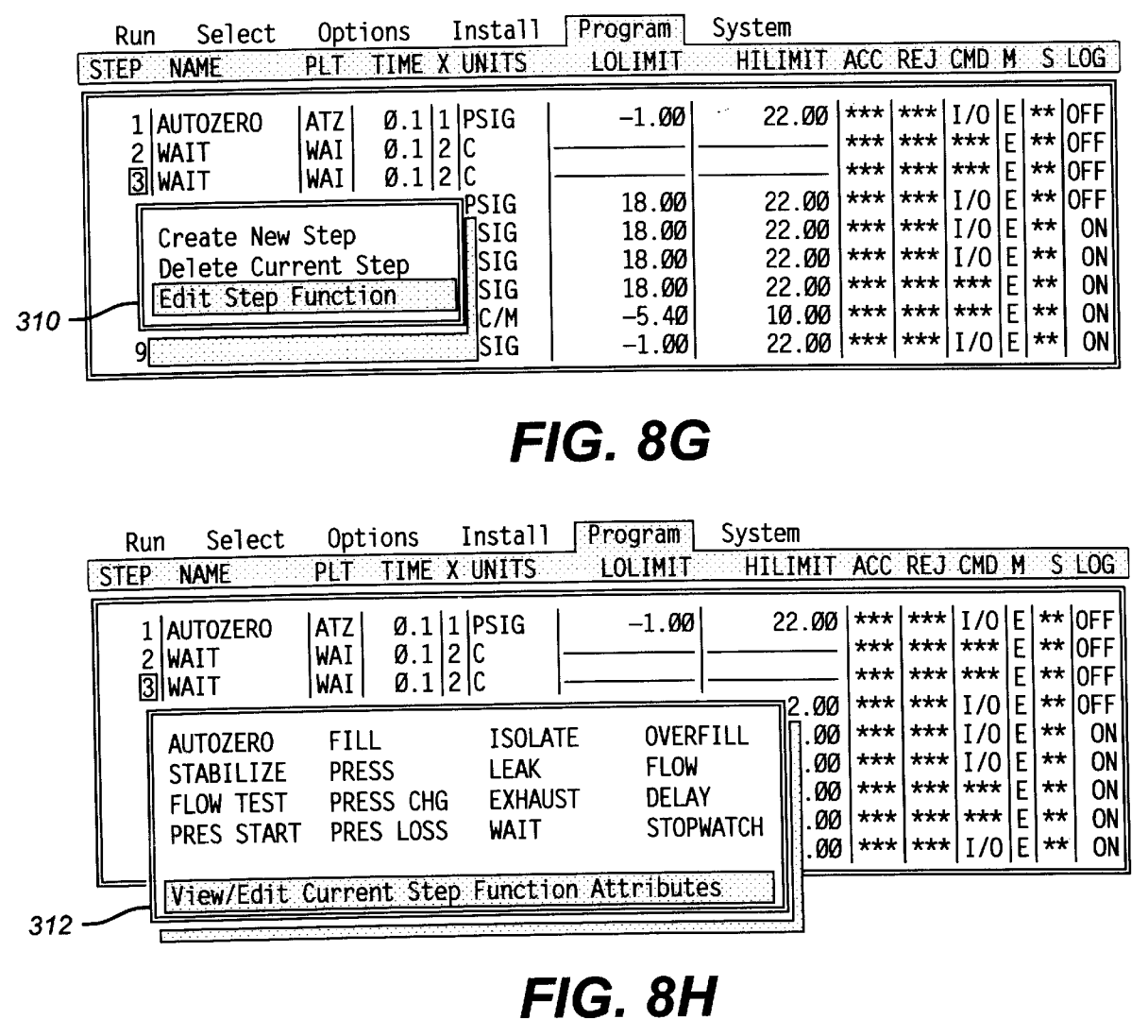

Proceeding to FIG. 8G, the step function of step 3 is edited. Proceeding to FIG. 8H, the attributes of that step are edited, and in FIG. 8I, it is seen that a number of options are available, which includes the option of inserting a math step for step 3. This option is selected, and proceeding to FIG. 8J, a menu of potential equations are presented. Seven potential equations A—G are shown in the menu 316. These are A—Summation; B—Linear Calculation such as for temperature compensation; C—Quadratic Calculations such as to linearize mass flow sensors; D—Sum of Products, E—Slope Calculation; F—Running Average; or G—Difference. Further, as will be appreciated below, these equations can be combined with multiple math steps.

Figures 8J, 8K:
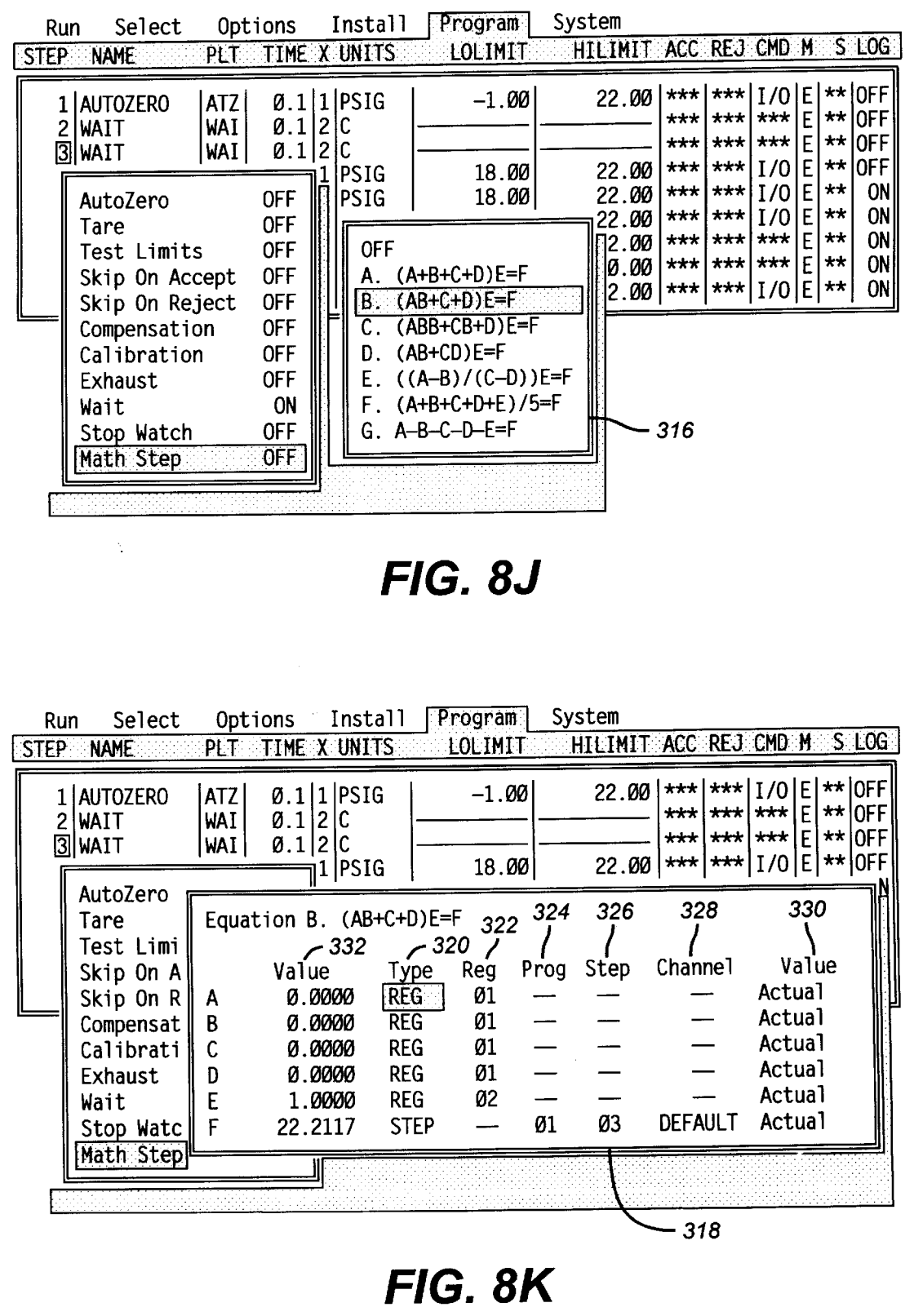

In FIG. 8J, equation B is chosen, which is of the form "$(AB+C+D)E=F$." This equation is selected, and proceeding to FIG. 8K, the source and destination for equation variables A, B, C, D, E, and F are selectable in columns including a register value column 332, a type of input column 320, register specification column 322, a program number column 324, and step column 326 if the source of the input is the output of a particular step, a channel column, which is A, B, or default if this is a dual channeled system, and the type of value to output column 330.

The type column 320 specifies what type of input or output this particular equation variable is to be. If "register,"

this indicates that the input or output is to be a stored register value specified in the register column 322. If the type in the type column 320 is instead "step," this indicates that an output is to be provided as the step result for the current step, or, if an input, is to be taken as the step result from the program and step specified in columns 324 and 326. In this initial table 318, for example, the F output is indicated to be the step result of program 1 (the current program) and step 3 (the current step). Other potential values in the column are step COMP, and step CAL, appearing as "COMP" and "CAL." As inputs, these receive the COMP (compensation) or CAL (calibration) value from another step in the program. As an output, these provide the compensation or calibration value for another step in the program or in another program. In this example, the output F will ultimately be set as a compensation value for the leak step of the program.

In the value column 330, the value can either be actual, which indicates that the value is represented by the actual value shown; absolute, which indicates a value is represented as an absolute value; or zero if neg, which indicates the value is represented by the actual positive value if positive or zero if negative or zero.

Finally, in the initial value column 332, register inputs can be set to a particular value. As shown in FIG. 8K, all of the values are initially set to zero (the value of register 1) with the exception of variable E, which is set to one (register 2 value).

To provide the variable temperature compensation using the equation programming according to the invention, these columns 320–332 are reprogrammed as illustrated in FIG. 8L. Variable A is set as a step input from program 1 (the present program), step 2. Referring to step 2 of this program, that is seen to be the wait step using transducer $T_2$ as an input. The result of that particular step is the value of the transducer $T_2$ at the end of the step. In this particular case, the wait step of step 2 provides as its output of the step the temperature provided by the transducer $T_2$ in ° C, which becomes the input value of equation B, variable A, as illustrated in FIG. 8L. The default channel is chosen, depending on whether channel A or channel B is being used for the current test. Further, variable B is set to –0.001, a value in register 3, which is provided as the slope of the line shown in FIG. 5. Variable C is set to 0.1, a value in register 4, which is the initial value $C_0$ illustrated in FIG. 5. Variable D is 0, and variable E is 1, which provides a multiplier of 1 for the entire equation. The output F is a COMP value to be used in program 1 (the present program), step 8, which referring to 8M, is the leak test step. Thus, the leak step will use the calculated COMP value from equation B as its COMP value input. Thus, the compensation will be variable dependent on the slope and initial value of the line of FIG. 5, yielding the equation:

$$COMP = -0.001 \cdot Temp + 0.1$$

Proceeding to FIG. 8M, the program 336 is now complete. It is seen that step 3 now has as its name "MATHSTEP B," which indicates a math step using equation B. Finally, the outputs are appropriately programmed for the wait step and the math step (steps 2 and 3) of FIG. 8N by programming the I/O's in the I/O command column 334.

Turning to FIGS. 9A and 9B, the outputs turned on and off by particular steps of the ultimate program 336 of FIG. 8N are shown. In FIG. 9A, the outputs for each step are shown. As is discussed earlier, the outputs 1, 2, and 3 control the valves $V_1$, $V_2$, and $V_3$. For the first five steps, valve $V_2$ is held open, with at step 4 (the overfill step) valve $V_3$ coupling the gas supply 200 through valve $V_1$, and then valve $V_2$ to the test part A. Then, at step 5, the fill step, valve $V_1$ is opened, coupling the regulator 202 through the valve $V_2$ to the test part A, providing a stable, gas pressure, such as at 20 psig. Proceeding to step 6, the isolation step, the valve $V_2$ is closed. Then at steps 7 and 8, valves $V_1$ and $V_3$ are deenergized such that when at step 9, the exhaust step, valve $V_2$ is open, remaining gas within the test part A is routed as exhaust.

Referring to the attributes for each step, shown in FIG. 9B, it is seen that a variety of attributes are provided. These include an autozero attribute, which allows for zeroing of the transducer input from the transducer $T_1$; a tare attribute, which allows an initial pressure at the start of the leak step to be used as a reference point for the ultimate pressure at the end of the leak step, thus providing a decrease in pressure as a test result; test limits, which provide pressure limit verification; skip on accept and skip on reject, none of which are used; compensation and calibration, both of which are on for the leak step (where the compensation is provided by the math step of step 3); exhaust, which indicates the step is an exhaust step; two wait steps, a stop watch, which is not used; and a math step, which as discussed above, is used at step 3.

It will be appreciated that a variety of other arrangements of the equations and the use of inputs and outputs can be used to create the variable temperature compensation using the math step illustrated above. One skilled in the art of computer programming will appreciate how to integrate the math step discussed above into a leak test program as illustrated in FIG. 8N. Generally, the leak test program is stored as a data array containing a sequence of steps. Each step includes a "step structure" which is a 64-byte structure that defines all aspects of the step, except for comp/cal data, which is contained in a separate data structure. Twelve bytes are normally reserved for the step name, but they are instead divided into two byte words that are used to define five input terms and one output term. Each term is defined in the following format:

Math Step Variable Bit Format
CCPUUUUUMMTTPPPP

C = Channel Number (Default = A, A = 1, B = 2)
P = Program Number (Internal base zero, displays base 1)
U = Step/Register Number (Internal base zero, displays base 1)
M = Filter Method (0 = Actual Value, 1 = Absolute Value, 2 = Zero if Negative)
T = Variable Type (0 = Step, 1 = COMP, 2 = CAL, 3 = Register)

It will be appreciated by those skilled in the programming art how to construct general input and output routines to perform the functions illustrated in FIGS. 8A–8N.

Figures 10A, 10B:
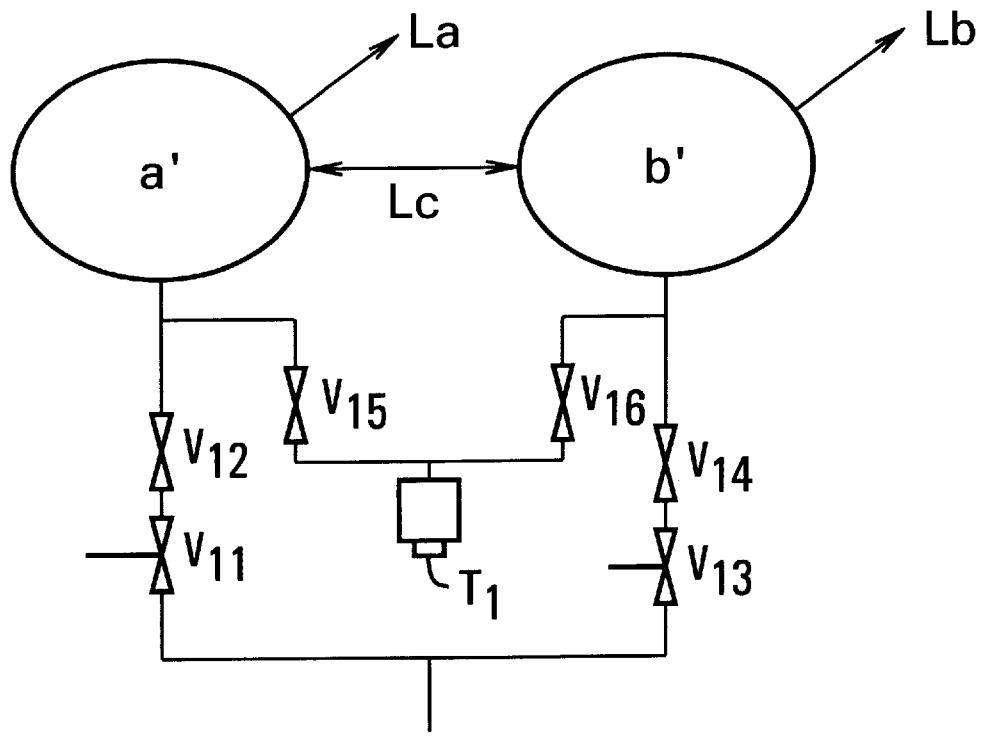
FIG. 10A is a conceptual flow diagram showing a configuration of valves for interwall leak testing according to the invention.
FIG. 10B is the equations for calculating the leakage values from the chambers of FIG. 10A.

The flexibility of this approach of providing math steps for various calculations, using inputs and outputs in the form of registers, step results, compensation, and calibration values becomes apparent by turning to FIGS. 10A and 10B and the corresponding outputs and equations of FIGS. 11A and 11B and 12A–12F. Specifically, shown in FIG. 10A is a flow/valve schematic for an interwall leakage testing between the walls of a part that has two chambers that might have a leak between those chambers. Six valves are shown, $V_{11}$–$V_{16}$. Further, two test parts A' and B' are shown, which are preferably part of a larger test part which includes potential leak values $L_a$ from the A' part, $L_b$ from the B' part, and $L_c$ specifying interwall leakage.

It is desirable to determine what each of these three values are. Determination of these values, however, is not straightforward. Referring to FIG. 10B, the equations necessary to determine $L_a$, $L_b$, and $L_c$ are shown. Specifically, a step result 4, which is a culmination of the sequence of steps that measures leakage from both chambers, equals a pressure loss for the leakage from both chambers $L_a+L_b$. The step result 9 is equal to the leakage from chamber A' plus the interwall leakage, $L_a+L_c$. The step result 14 is equal to the leakage from the chamber B' plus the interwall leakage, $L_b+L_c$. Four math steps are used, illustrated and discussed below in conjunction with FIGS. 12C–12F, to calculate these three leakage values $L_a$, $L_b$, and $L_c$. The corresponding steps where the math steps are implemented are shown on the right hand side of FIG. 10B. Specifically, the step result of step 9 is added to the step result of step 14, and this yields $L_a+L_b+2 \cdot L_c$. Combining this equation with the step result of 4, and rearranging, $L_c$ is determined to be the step result of 9 plus the step result of 14 (calculated at step 16) minus the step result of 4 divided by two. This value is saved, and is used to calculate the leakages $L_a$ and $L_b$ through combination with the step result of 9 and step result of 14, which is performed in steps 18 and 19 of the program illustrated in FIGS. 12C–12F.

It is appreciated that the math steps are very useful in calculating these values. Referring to FIGS. 11A and 11B, output values and step attributes are shown which correspond to the program illustrated in FIGS. 12A and 12B, a program which has been previously generated to incorporate math steps in steps 16–19 for calculation of $L_a$, $L_b$, and the interwall leakage $L_c$. Referring briefly to FIG. 12A, it is seen that three programming sequences are provided, a first sequence 400, a second sequence 402, and a third sequence 404. The first sequence determines $L_a+L_b$, because, referring to FIG. 11A, valves $V_{15}$ and $V_{16}$ are kept open, thus allowing communication through valves $V_{11}$ and $V_{12}$ and through valves $V_{15}$ and $V_{16}$ to both chambers of A' and B'. The next sequence 402 is solely for testing the leakage of $L_a+L_c$, from the test part A'. Valves $V_{11}$ and $V_{12}$ pressurize and then isolate the test part A', and the transducer $T_1$ senses the pressure in the test part A' through $V_{15}$. Valve $V_{16}$ is closed, and $V_{14}$ is open to $V_{13}$, which vents to atmosphere. Finally, in test sequence 404, the same is done as in the sequence 402, but test chamber B' is tested, being pressurized then vented through $V_{14}$ and $V_{13}$, with the pressure sensed through $V_{16}$ which couples the transducer $T_2$ to the test chamber B'. $V_{15}$ is closed and $V_{12}$ and $V_{11}$ vent the test chamber A' to the atmosphere.

Figure 12C:
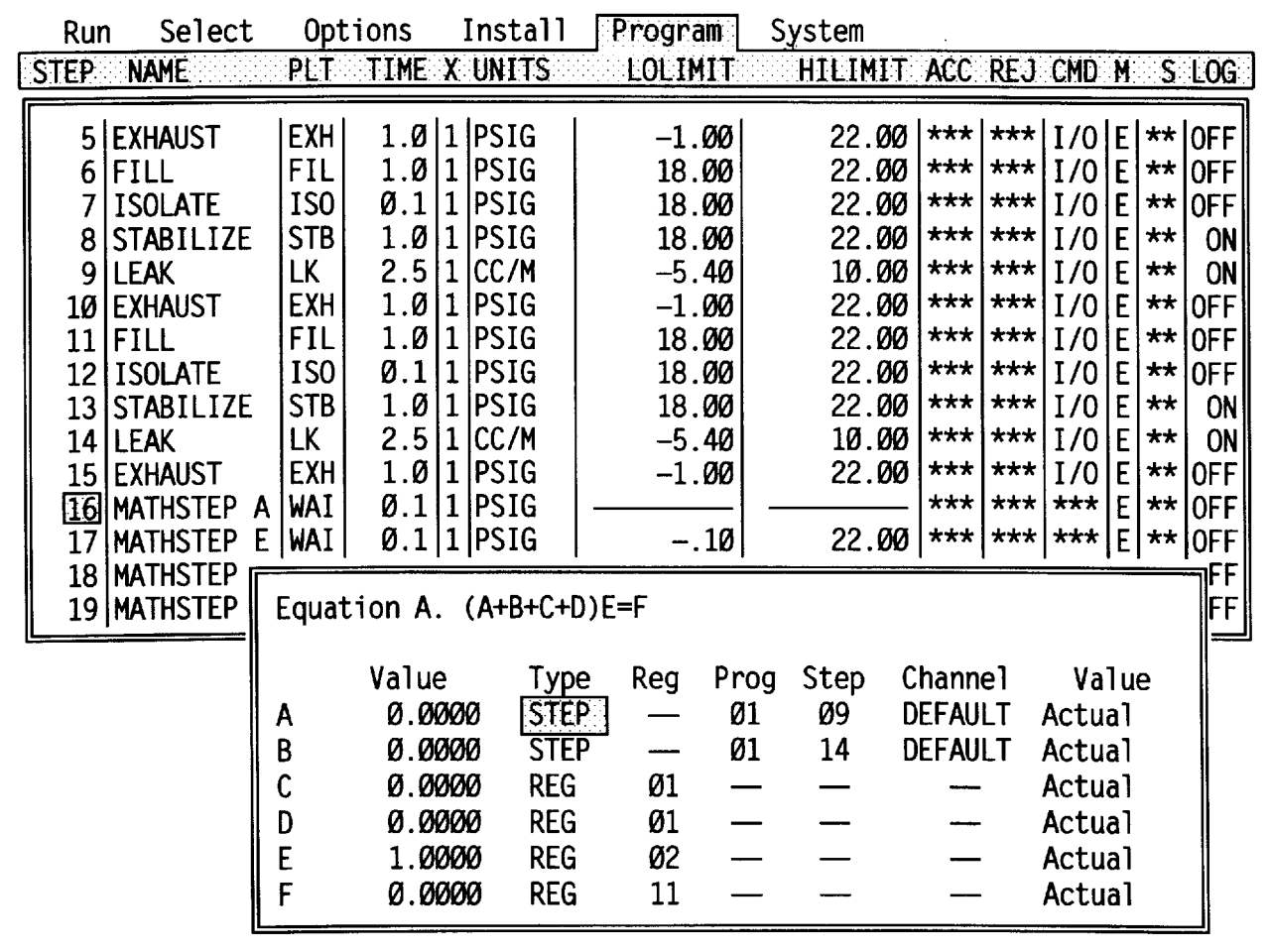
Figure 12D:
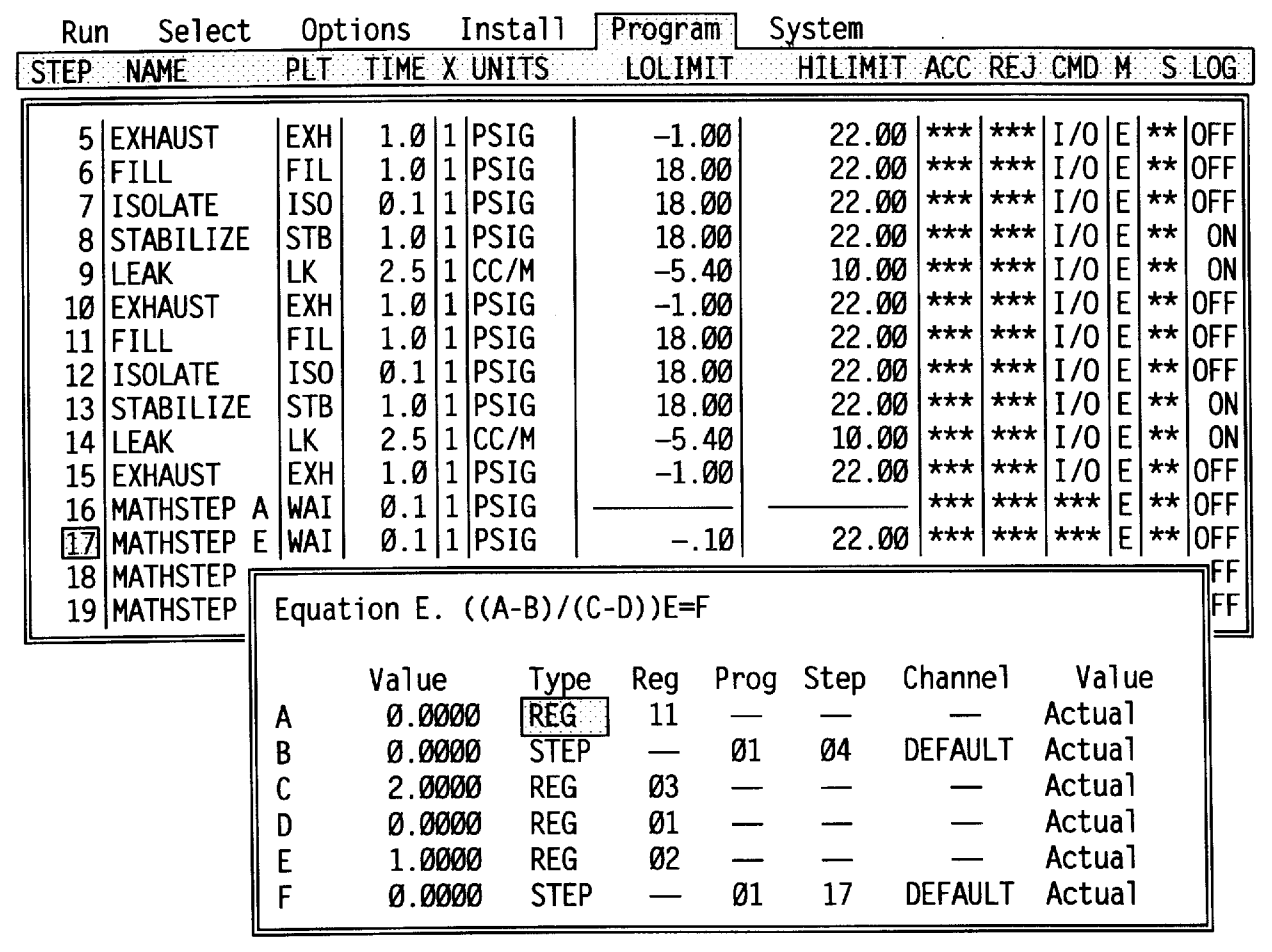

After these three sequences of tests, the resulting leak values are known for $L_a+L_b$, $L_a+L_c$, and $L_b+L_c$. It is using math steps of equations of steps 16–19, here illustrated as the sequence 406 in FIG. 12B, that the values of $L_a$, $L_b$, and $L_c$ are determined. The equation variables for the four math steps are illustrated in FIGS. 12C–12F. In FIG. 12C, the leakage step results of the leak step 9 and leak step 14 are added together yielding a result stored in register 11. In FIG. 12D, step 17 subtracts that result in register 11 from the leak result of step 4, divides by 2 (variable C, from register 3), and provides that result as $L_c$ as the step result. Proceeding to FIGS. 12E and 12F, the values of $L_a$ and $L_b$ are calculated. Specifically, $L_a$ is the result of the leak value determined at step 9 subtracted with the value of $L_c$ (the step result of step 17) subtracted out. In FIG. 12F, the same is done with the leak result of step 14, with the value of $L_c$ (the step result of step 17) subtracted out. These results $L_c$, $L_a$, and $L_b$ become the step results of steps 17, 18, and 19.

These step results are then tested against leak limits set by LOLIMIT and HILIMIT. Referring to FIG. 11B, the "Test Limits" attribute is on for steps 17–19, so it is appreciated that the actual value calculated can then be used to accept or reject a test part.

Figures 13, 14:
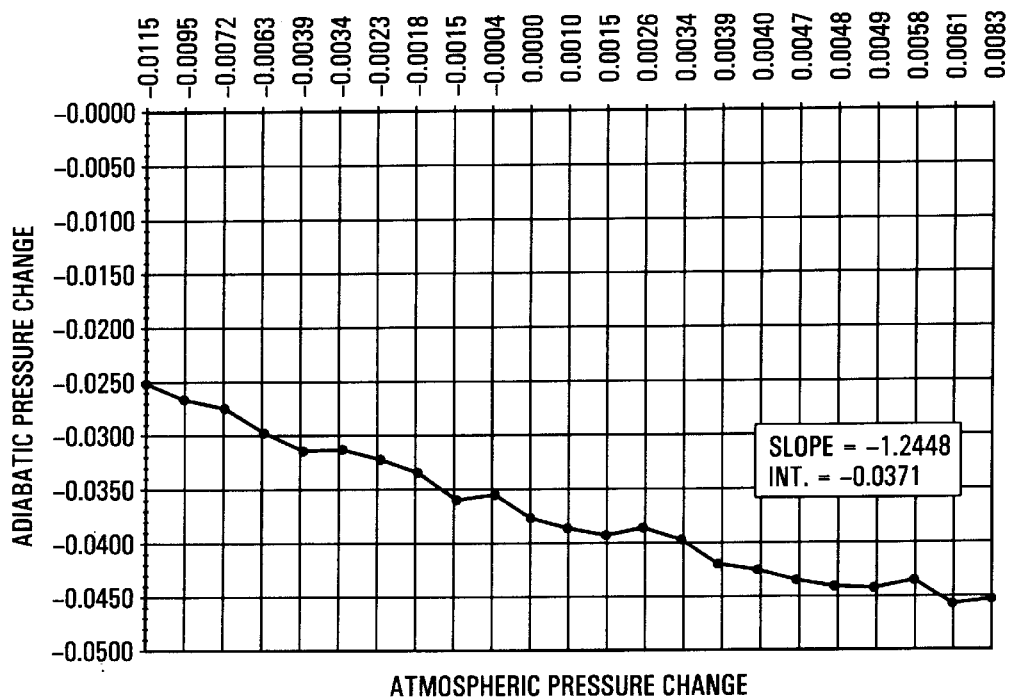
FIG. 13 is a graph illustrating atmospheric pressure change versus adiabatic pressure change.
FIG. 14 is a screen capture illustrating an equation for providing the pressure change method of temperature compensation.

Turning to FIGS. 13 and 14, yet another use for the math step according to the invention is shown. In these figures, illustrated is a program which provides for a pressure change method of temperature compensation. In the pressure change method, the appropriate compensation value is determined by first flushing the part, then closing the part, and then monitoring the pressure change. The pressure change will be dependent on the temperature of the part relative to the ambient temperature. Referring to FIG. 13, shown is a typical atmospheric pressure change plot versus the adiabatic pressure change of a closed part. Once this plot is determined, the test is programmed with a math step as illustrated in FIG. 14. In that math step, the input is provided from step 3, a pressure change step. The transducer is first autozeroed, and then the part isolated in steps 1 and 2. The transducer $T_1$ then returns a pressure change over a period of two seconds. This pressure change is used as a variable in a linear equation of the form:

$$F = -1.2448 \cdot Pressure\ Change - 0.0371$$

As illustrated in FIG. 14, the output of this equation is used as a compensation value for the leak step, program 1, step 8. Thus, the math step according to the invention further shows its utility in the use of a pressure change temperature compensation method.

The foregoing disclosure and description of the invention are illustrative and explanatory thereof, and various changes in the details of the illustrated apparatus and construction and method of operation may be made without departing from the spirit of the invention.

What is claimed is:

1. A method of leak testing using a programmable leak tester having outputs and transducer inputs, the method comprising the steps of:

storing a leak test program having a series of steps; and selecting an equation in said program by performing the steps of:
choosing one of a plurality of equations having a plurality of input variables and an output variable;
selecting for each of the plurality of inputs one of:
a register value;
a compensation value;
a calibration value; or
a step result; and
selecting for the output one of:
output comp value;
output cal value;
output step result; or
output register.

2. The method of claim 1, wherein the step of choosing one of the plurality of equations includes the step of choosing from:

$F = (A+B+C+D) \cdot E;$ $F = (A \cdot B+C+D) \cdot E;$ $F = (A \cdot B \cdot B+C \cdot B+D) \cdot E;$ $F = (A \cdot B+C \cdot D) \cdot E;$ $F = [(A-B)/(C \cdot D)] \cdot E;$ $F = (A+B+C+D+E)/5;$ or $F = (A-B-C-D-E).$ 3. The method of claim 1, wherein the output comp value is used as a compensation value for one of the series of steps.

4. The method of claim 1, wherein the output cal value is used as a calibration value for one of the series of steps.

5. The method of claim 1 further comprising the steps of:
after the choosing one of the plurality of equations step, choosing a second equation;
selecting for the output of the first selected equation an output register; and
selecting for an input of the second selected equation the output register of the first selected equation.

6. The method of claim 1, wherein the series steps is selected to form a temperature compensation leak test.

7. The method of claim 6, wherein the step of choosing an equation further comprises the steps of:
selecting an equation of the form:

$$COMP = MT + C_0$$

where:
COMP is the compensation value used by a leak step;
M is a slope constant;
T is a temperature read from a transducer; and
$C_0$ is the COMP value for T=0.

8. The method of claim 6, wherein the leak tester has a temperature input, wherein the step of choosing an equation further comprises the steps of:
selecting as the equation:

$$F = (A \cdot B + C + D) \cdot E;$$

selecting the inputs to be:
A=temperature compensation slope value;
B=a step result of a step which returns a temperature value from the temperature input;
C=a base compensation value for when B=0;
D=0; and
E=1; and
selecting the output to be the comp input of a leak test step.

9. The method of claim 1, wherein the series of steps is selected to form three leak tests for a first chamber, a second chamber, and both chambers to determine interwall leakage.

10. The method of claim 9, wherein the step of choosing an equation further comprises the steps of:
selecting equations of the form:

$$L_c = \frac{([L_a + L_c] + [L_b + L_c] - [L_a + L_b])}{2}$$

where:
$L_c$ is an interwall leakage value;
$[L_a + L_c]$ is a leakage value measured by the first leak test;
$[L_b + L_c]$ is a leakage value measured by the second leak test; and
$[L_a + L_b]$ is a leakage value measured by the third leak test.

11. The method of claim 9, wherein each leak test provides a leak value step result, the method further comprising the steps:
selecting as a first equation:

$$F_1 = (A_1 + B_1 + C_1 + D_1) \cdot E;$$

selecting as first inputs:
$A_1$=the first chamber leak value step result;
$B_1$=the second chamber leak value step result;
$C_1=0$;
$D_1=0$; and
$E_1=1$;
selecting as a first output:
$F_1$=a first register value;
selecting as a second equation:

$$F_2 = [(A_2 - B_2)/(C_2 - D_2)] \cdot E_2$$

selecting as second inputs:
$A_2$=the first register value;
$B_2$=the both chamber leak value step result;
$C_2=2$;
$D_2=0$; and
$E_2=1$; and
selecting as a second output:
$F_2$=a second register value, which holds an interwall leakage value.

12. The method of claim 11 further comprising the steps of:
selecting as a third equation:

$$F_3 = A_3 - B_3 - C_3 - D_3 - E_3;$$

selecting as third inputs:
$A_3$=the first chamber leak value step result;
$B_3$=the second register value; and
$C_3 = D_3 = E_3 = 0$; and
selecting as a third output:
$F_3$=a third register value which holds the first chamber leakage value without interwall leakage.

13. The method of claim 1, wherein the series of steps is selected to form a leak test with pressure change based temperature compensation.

14. The method of claim 13, wherein the step of choosing an equation further comprises the steps of:
selecting an equation of the form:

$$COMP = MP + C_0$$

where:
COMP is the compensation value used by a leak step;
M is a slope constant;
P is a pressure read from a transducer after a test part is sealed; and
$C_0$ is a COMP value for P=0.

15. The method of claim 13 further comprising the steps of:
choosing as an equation:

$$F = (A \cdot B + C + D) \cdot E$$

selecting as inputs:
A=a step result of a previous closed test piece pressure change step;
B=a slope;
C=a constant;
D=0; and
E=1; and
selecting as an output:
F=comp value for a leak step.

16. A programmable leak tester comprising:
output controls;
a display;
a stored program for programming leak tests, the stored program comprising:

code to accept selection of one of a plurality of equations having a plurality of input variables and output variables;
code to select for each of the plurality of inputs one of:
   a register value;
   a compensation value;
   a calibration value; or
   a step result; and
code to select for the output one of:
   output comp value;
   output cal value;
   output step result; or
   output register.

17. The programmable leak tester of claim 16 further comprising transducer inputs for temperature and pressure transducers.

18. The programmable leak tester of claim 16, wherein said code to accept selection of one of a plurality of equations further comprises code to accept selection from:

$F=(A+B+C+D) \cdot E;$ $F=(A \cdot B+C+D) \cdot E;$ $F=(A \cdot B \cdot B+C \cdot B+D) \cdot E;$ $F=(A \cdot B+C \cdot D) \cdot E;$ $F=[(A-B)/(C-D)] \cdot E;$ $F=(A+B+C+D+E)/5;$ or $F=(A-B-C-D-E).$

* * * * *